United States Patent
Jung et al.

(10) Patent No.: US 12,282,544 B2
(45) Date of Patent: Apr. 22, 2025

(54) RESOURCE MONITORING DEVICE AND METHOD USING HARDWARE ABSTRACTION LAYER

(71) Applicant: Foundation of Soongsil University-Industry Cooperation, Seoul (KR)

(72) Inventors: Soohwan Jung, Seoul (KR); Thien-Phuc Doan, Seoul (KR); Hyunseok Shim, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 260 days.

(21) Appl. No.: 17/925,553

(22) PCT Filed: Nov. 26, 2020

(86) PCT No.: PCT/KR2020/016899
§ 371 (c)(1),
(2) Date: Nov. 15, 2022

(87) PCT Pub. No.: WO2021/256634
PCT Pub. Date: Dec. 23, 2021

(65) Prior Publication Data
US 2023/0195891 A1  Jun. 22, 2023

(30) Foreign Application Priority Data
Jun. 19, 2020 (KR) .......... 10-2020-0074765

(51) Int. Cl.
*G06F 21/55* (2013.01)
*G06F 11/07* (2006.01)

(52) U.S. Cl.
CPC .......... *G06F 21/552* (2013.01); *G06F 11/076* (2013.01); *G06F 21/554* (2013.01)

(58) Field of Classification Search
CPC ..... G06F 21/554; G06F 11/076; G06F 21/552
USPC .......................................... 726/23
See application file for complete search history.

(56) References Cited

U.S. PATENT DOCUMENTS

| | | | |
|---|---|---|---|
| 2015/0161386 A1* | 6/2015 | Gupta | G06N 5/04 726/22 |
| 2019/0377871 A1* | 12/2019 | Park | G06F 21/552 |

FOREIGN PATENT DOCUMENTS

| | | |
|---|---|---|
| KR | 1020130031035 A | 3/2013 |
| KR | 10-2013-0075300 A | 7/2013 |
| KR | 10-2015-0134171 A | 12/2015 |
| KR | 101628837 B1 | 6/2016 |
| KR | 10-2017-0014633 A | 2/2017 |
| KR | 10-1899774 B1 | 9/2018 |
| KR | 1020190006901 A | 1/2019 |
| KR | 102096785 B1 | 3/2020 |

* cited by examiner

Primary Examiner — Frantz B Jean
(74) Attorney, Agent, or Firm — Stein IP LLC (57) ABSTRACT

Provided is a resource monitoring apparatus including a log generation unit for extracting a method requested from a hardware abstraction layer and generating a log; a log classification unit for classifying the generated log according to a type of an interface connected to the method; and a log determination unit for identifying a malicious activity from the classified log based on pattern information of the log set differently depending on the type of the interface.

16 Claims, 6 Drawing Sheets

RESOURCE MONITORING DEVICE AND METHOD USING HARDWARE ABSTRACTION LAYER

CROSS-REFERENCE TO RELATED APPLICATIONS

This application is a national stage of International Application No. PCT/KR2020/016899, filed Nov. 26, 2020, which claims the benefit of Korean Application No. 10-2020-0074765, filed Jun. 19, 2020, in the Korean Intellectual Property Office, the disclosures of which are incorporated herein by reference.

TECHNICAL FIELD

The present disclosure relates to a resource monitoring apparatus and method using a hardware abstraction layer, and more particularly, to a resource monitoring apparatus and method, in which logs of methods requested from a hardware abstraction layer are classified according to hardware interfaces, and malicious activities are determined based on the classified logs.

BACKGROUND ART

A Hardware Abstraction Layer (HAL) refers to a standard interface that hardware vendors implement, which enables an operating system (OS) to control each hardware installed on a device without implementing lower-level hardware drivers. Accordingly, the OS can implement the functionality of the hardware using the hardware abstraction layer without affecting or modifying the higher level system.

On the other hand, most of attackers who intend to manipulate the resources of the device aim at stealing sensitive data stored in the device or transmitted to the device by manipulating the resources of the hardware such as camera, microphone, phone and Short Message Service (SMS). In relation to this, some of the resource manipulation detection techniques collect called sensitive Application Programming Interface (API) logs by the hooking techniques that require root permissions, and some analyze the source code for Android permissions, to which attention needs to be paid.

However, unfortunately, most of the existing resource manipulation detection techniques are easily monitored by the evasion techniques of malware hard to analyze.

DISCLOSURE

Technical Problem

The present disclosure is directed to providing a resource monitoring apparatus and method, in which logs of methods requested from a hardware abstraction layer are classified according to hardware interfaces, and malicious activities are determined based on the classified logs.

Technical Solution

In an aspect of the present disclosure, a resource monitoring apparatus may include a log generation unit for extracting a method requested from a hardware abstraction layer of an operating system installed on a device and recording the extracted method to generate a log; a log classification unit for classifying the generated log according to a type of an interface connected to the method; and a log determination unit for determining a malicious activity from the classified log based on pattern information of the log set differently depending on the type of the interface.

Additionally, the log generation unit may record a method for a short message service and a phone call requested from a radio interface to generate a log.

Additionally, the log classification unit may classify the log generated by the radio interface into a plurality of preset methods based on a method requested from the radio interface.

Additionally, the log determination unit may determine that a malicious activity occurs in the radio interface in response to the generated log being determined as a method requesting for sending a short message among a method requested from the radio interface, and a number of times the method requesting for sending a short message repeatedly occurs within a preset first time interval exceeding a preset number of times.

Additionally, the interface may include a camera interface having a method for a camera device connected to the device; and a position interface having a method for a satellite positioning device connected to the device.

Additionally, the interface may further include a sensor interface, a proximity communication interface, a microphone interface and a vibrator interface.

Additionally, the log determination unit may calculate, from a log classified according to the camera interface, a time interval from a start time of a camera device to a stop time of the camera device, and determines that a malicious activity occurs in the camera interface in response to the time interval exceeding a preset third time interval.

Additionally, the log determination unit may determine, from a log classified according to the position interface, that a malicious activity occurs in the position interface in response to a number of times a method requesting position information is generated and accumulated for a predetermined period of time exceeding a preset number of times within a preset second time interval.

In another aspect of the present disclosure, a resource monitoring method of a resource monitoring apparatus using a hardware abstraction layer may include extracting a method requested from a hardware abstraction layer of an operating system installed on a device; recording the extracted method to generate a log; classifying the generated log according to a type of an interface connected to the method; and determining a malicious activity from the classified log based on pattern information of the log set differently depending on the type of the interface.

Additionally, generating the logs may include recording a method for a short message service and a phone call requested from a radio interface to generate a log.

Additionally, classifying the logs may include classifying the log generated by the radio interface into a plurality of preset methods based on a method requested from the radio interface.

Additionally, determining the malicious activity may include determining that a malicious activity occurs in the radio interface in response to the generated log being determined as a method requesting for sending a short message among a method requested from the radio interface, and a number of times the method requesting for sending a short message repeatedly occurs within a preset first time interval exceeding a preset number of times.

Additionally, the interface may include a camera interface having a camera interface having a methods for a camera device connected to the device; and a position interface having a method for a satellite positioning device connected to the device.

Additionally, the interface may further include a sensor interface, a proximity communication interface, a microphone interface and a vibrator interface.

Additionally, determining the malicious activity may include calculating, from a log classified according to the camera interface, a time interval from a start time of a camera device to a stop time of the camera device, and determining that a malicious activity occurs in the camera interface in response to the time interval exceeding a preset third time interval.

Additionally, determining the malicious activity may include, from a log classified according to the position interface, determining that a malicious activity occurs in the position interface in response to a number of times a method requesting position information is generated and accumulated for a predetermined period of time exceeding a preset number of times within a preset second time interval.

Advantageous Effects

According to an aspect of the present disclosure, there is provided the resource monitoring apparatus and method using a hardware abstraction layer, thereby classifying logs of methods requested from the hardware abstraction layer according to hardware interfaces, and determining malicious activities based on the classified logs.

BEST MODE

The following detailed description of the present disclosure is made with reference to the accompanying drawings, in which particular embodiments for practicing the present disclosure are shown for illustrative purposes. These embodiments are described in sufficient detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs indicate same or similar functions in many aspects.

Hereinafter, exemplary embodiments of the present disclosure will be described in more detail with reference to the accompanying drawings.

Figure 1:
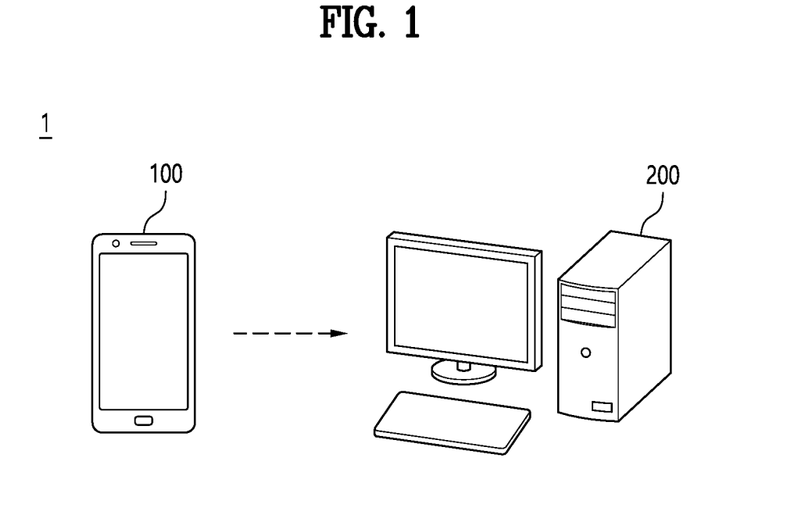
FIG. 1 is a schematic diagram of a resource monitoring system according to an embodiment of the present disclosure.

FIG. 1 is a schematic diagram of a resource monitoring system according to an embodiment of the present disclosure.

The resource monitoring system 1 may include a device 100 and a resource monitoring apparatus 200.

In this instance, the device 100 may include a radio device, a camera device, a satellite positioning device, a sensing device, a proximity communication device, a microphone device and a vibration device connected to or embedded or mounted in the device 100.

Here, the device 100 may be a device, on which an Operating System (OS) including a Hardware Abstraction Layer (HAL) is installed. In this instance, the OS including the hardware abstraction layer may refer to Android OS, and accordingly, the device 100 may include a smartphone and a tablet on which the Android OS is installed.

Meanwhile, the radio device may be connected to or embedded or mounted in the device 100 to perform Short Message Service (SMS) or make calls with another device 100 by the control of the device 100.

Here, the radio device may be configured to transmit or receive short messages to/from another device 100 using wireless communication, and the radio device may be configured to make calls with another device 100 using wireless communication.

For example, the radio device may include a Subscriber Identification Module (SIM) card or a Universal Subscriber Identity Module (USIM) chip embedded in the device 100, and the radio device may correspond to a hardware driver represented as 'libril-vendor.so' file.

Additionally, the camera device may be connected to or embedded or mounted in the device 100 to take pictures to generate image information by the control of the device 100, the satellite positioning device may be connected to or embedded or mounted in the device 100 to measure positions to generate position information by the control of the device 100, and the sensing device may be connected to or embedded or mounted in the device 100 to generate arbitrary measurement information by the control of the device 100.

In this instance, the sensing device may include a gyro sensor and an acceleration sensor capable of measuring the rotational movement of the device 100 or acceleration in the movement. The sensing device may include sensors capable of measuring the surrounding environmental conditions such as temperature, pressure, light intensity and humidity. The sensing device may include a touch sensor capable of recognizing a user's touch.

Additionally, the proximity communication device may refer to a Near Field Communication (NFC) device connected to or embedded or mounted in the device 100 to carry out communication using the frequency of 13.56 MHz at the distance of 10 cm or less, the microphone device may be connected to or embedded or mounted in the device 100 to detect sound waves transmitted from the outside to generate audio information by the control of the device 100, and the vibration device may be connected to or embedded or mounted in the device 100 to generate vibration by the control of the device 100.

In relation to this, the Android OS installed on the device 100 may include a hardware layer, a Linux kernel layer, a hardware abstraction layer, a framework layer and an application program layer.

The hardware layer may refer to a device connected to the device 100, and accordingly, the device connected to the device 100 may be understood as hardware.

The Linux kernel layer may contain hardware drivers that access and control each device of the hardware layer. Accordingly, the Linux kernel layer may transmit information generated from each device connected to the device 100 to the Android OS, and the Linux kernel layer may be responsible for process and memory management, security, network and power management.

The hardware abstraction layer may be a layer for supporting the independence of the devices connected to the device 100, and the hardware abstraction layer provides an abstraction for the devices connected to the device 100, thereby making it possible to control each device without needing to directly access each device. To this end, when events are generated from the hardware drivers, the hardware abstraction layer may request methods that match the corresponding events, and transmit the requested methods to the framework layer.

The framework layer may include a class used to write an application program such as an application and software based on Android OS, and an abstract class for hardware interface, user interface and resource management. Accordingly, a developer of the application based on Android OS may write the application using Application Programming Interface (API) in the framework layer.

Accordingly, the resource monitoring apparatus 200 may extract the methods requested from the hardware abstraction layer of the OS installed on the device 100, and the resource monitoring apparatus 200 may record the extracted methods to generate logs.

To this end, the resource monitoring apparatus 200 may be in the form of an application or an application program installed in the device 100 to record the methods requested from the hardware abstraction layer of the device 100, and the resource monitoring apparatus 200 may be an arbitrary apparatus connected to the device 100 using a wired or wireless network to record the methods requested from the hardware abstraction layer of the device 100.

Here, the log may include the name of the method, the time at which the method was requested, the type of the interface that requests the method and a variable value set to the method.

In this instance, the interface that requests the method may be independent according to the device connected to the device 100, and accordingly, the method may be included in the interface for each device connected to the device 100.

Additionally, the interface for each device connected to the device 100 may be present in the hardware abstraction layer, and accordingly, the event generated from the device connected to the device 100 may be transmitted to the interface in the hardware abstraction layer for the corresponding device to request the method that matches the corresponding event.

In this instance, the interface may refer to hardware interface.

For example, the interface may include a radio interface, a camera interface, a position interface, a sensor interface, a proximity communication interface, a microphone interface and a vibration interface.

Here, the radio interface may be configured to perform the function of Radio Interface Layer (RIL) connecting the radio device 151 configured to perform SMS and phone functions to the framework layer.

Accordingly, the resource monitoring apparatus 200 may record the methods for SMS and phone calls requested from the radio interface to generate the logs.

In relation to this, the radio interface may be present at the position 'hardware/ril/' of the Android OS.

Additionally, the camera interface may be represented as CameraDevice.cpp at the position 'hardware/camera/device/1.0/default/' of the Android OS, and in this instance, the camera interface may include the methods such as getCameraInfo, dumpState, CameraHeapMemory, Camera::open, Camera::close, startRecording, stopRecording, takePicture, and cancelPicture.

The position interface may be present at the position 'hardware/interface/GNSS/1.0/default/' of the Android OS, the sensor interface may be present at the position 'hardware/interface/sensors/1.0/default/' of the Android OS, and the proximity communication interface may be present at the position 'hardware/interface/nfc/1.0/default/' of the Android OS.

Additionally, the microphone interface may be present at the position 'hardware/interface/automotive/audiocontrol/1.0/default/' of the Android OS, and the vibration interface may be present at the position 'hardware/interface/vibrator/1.0/default/' of the Android OS.

Meanwhile, the resource monitoring apparatus 200 may extract the generated logs using logcat command that is used to record the methods requested from the hardware abstraction layer of the Android OS.

The resource monitoring apparatus 200 may classify the logs generated from the requested methods according to the type of interface connected to the methods.

In this instance, the resource monitoring apparatus 200 may classify the logs generated by the radio interface into a plurality of preset methods based on the method requested from the radio interface.

Additionally, the resource monitoring apparatus 200 may classify the logs by generating separate methods to include an arbitrary method requested from the hardware abstraction layer by the interface for each device connected to the device 100.

For example, the resource monitoring apparatus 200 may classify the logs into at least one method of RIL_REQUEST_GET_IMSI, RIL_REQUEST_SIGNAL_STRENGTH, RIL_REQUEST_SEND_SMS, RIL_REQUEST_SEND_SMS_EXPECT_MORE, RIL_REQUEST_SEND_USSD, RIL_REQUEST_GET_IMEI, RIL_REQUEST_GET_IMEISV, RIL_REQUEST_DATA_CALL_LIST, RIL_REQUEST_RESET_RADIO, RIL_REQUEST_DELETE_SMS_ON_SIM RIL_REQUEST_SET_TTY_MODE, RIL_REQUEST_SEND_DEVICE_STATE, RIL_REQUEST_START_NETWORK_SCAN and RIL_REQUEST_STOP_NETWORK_SCAN that are generated separately from the methods requested from the radio interface.

Additionally, by the interface for each device connected to the device 100, the resource monitoring apparatus 200 may extract and classify the logs for at least one of the methods requested from the hardware abstraction layer.

For example, the resource monitoring apparatus 200 may classify the logs generated when a request for sending a short message is made among the methods requested from the radio interface, and the resource monitoring apparatus 200 may extract and classify the logs generated when a request for calling history is made among the methods requested from the radio interface.

Additionally, the resource monitoring apparatus 200 may extract and classify the logs generated when the camera device operates and the logs generated when the camera device stops operating among the methods requested from the camera interface.

Additionally, the resource monitoring apparatus 200 may extract and classify the logs generated when a request for position information is made among the methods requested from the position interface.

Additionally, the resource monitoring apparatus 200 may extract and classify the logs generated when a request for arbitrary measurement information is made among the methods requested from the sensor interface, and the resource monitoring apparatus 200 may extract and classify the logs generated when a request to carry out proximity communication is made among the methods requested from the proximity communication interface.

Additionally, the resource monitoring apparatus 200 may extract and classify the logs generated when the microphone device operates and the logs generated when the microphone device stops operating among the methods requested from the microphone interface.

Additionally, the resource monitoring apparatus 200 may extract and classify the logs generated when the vibration device operates and the logs generated when the vibration device stops operating among the methods requested from the vibration interface.

Accordingly, the resource monitoring apparatus 200 may determine malicious activity from the classified logs based on pattern information of the logs set differently depending on the type of the interface.

Here, the malicious activity may refer to hacking activity done by a malicious program installed in the device 100, and this activity may include intercepting information, interrupting the flow of communication or information, falsifying transmitted or received information and sending too much information.

Additionally, the pattern information may refer to a pattern of methods set to determine the malicious activity from the logs classified according to an arbitrary interface.

For example, when the generated log is determined as the method requesting for sending a short message among the methods requested from the radio interface, and the number of times the method requesting for sending a short message repeatedly occurs within a preset first time interval exceeds a preset number of times, the resource monitoring apparatus 200 may determine that the malicious activity occurred in the radio interface.

Here, the first time interval may be set to monitor a phenomenon, in which an arbitrary method is generated a few times to a few tens of times per second, and in this case, the resource monitoring apparatus 200 may determine that the malicious activity occurred when the method requesting for sending a short message repeatedly occurs at a very short time interval.

Additionally, among the methods requested from the radio interface, when the number of times the method requesting calling history associated with the generated log occurs within a preset second time interval exceeds a preset number of times, the resource monitoring apparatus 200 may determine that the malicious activity occurred in the radio interface.

Here, the second time interval may be set to monitor a phenomenon, in which an arbitrary method occurs a few times to a few tens of times for a short time.

Additionally, from the logs classified according to the camera interface, the resource monitoring apparatus 200 may calculate a time interval from the start time of the camera device to the stop time of the camera device, and accordingly, when the calculated time interval exceeds a preset third time interval, the resource monitoring apparatus 200 may determine that the malicious activity occurred in the camera interface.

Here, the third time interval may be set to monitor a phenomenon, in which the control operation according to an arbitrary method continues for a long time.

Additionally, from the logs classified according to the position interface, when the number of times the method requesting position information is generated and accumulated for an arbitrary period of time exceeds the preset number of times within the preset second time interval, the resource monitoring apparatus 200 may determine that the malicious activity occurs in the position interface.

Additionally, from the logs classified according to the sensor interface, when the number of times the method requesting arbitrary measurement information occurs exceeds the preset number of times within the preset second time interval, the resource monitoring apparatus 200 may determine that the malicious activity occurred in the sensor interface.

Additionally, from the logs classified according to the proximity communication interface, when the number of times the method requesting to carry out proximity communication repeatedly occurs within the preset first time interval exceeds the preset number of times, the resource monitoring apparatus 200 may determine that the malicious activity occurred in the proximity communication interface.

Additionally, from the logs classified according to the microphone interface, the resource monitoring apparatus 200 may calculate the time interval from the start time of the microphone device to the stop time of the microphone device, and when the calculated time interval exceeds the preset third time interval, the resource monitoring apparatus 200 may determine that the malicious activity occurred in the microphone interface.

Additionally, from the logs classified according to the vibration interface, the resource monitoring apparatus 200 may calculate the time interval from the start time of the vibration device to the stop time of the vibration device, and when the calculated time interval exceeds the preset third time interval, the resource monitoring apparatus 200 may determine that the malicious activity occurred in the vibration interface.

Additionally, from the logs classified according to the vibration interface, when the number of times the method requesting to perform the operation of the vibration device and the method requesting to stop the operation of the vibration device repeatedly occur within the preset first time interval exceeds the preset number of times, the resource monitoring apparatus 200 may determine that the malicious activity occurred in the vibration interface.

Figure 2:
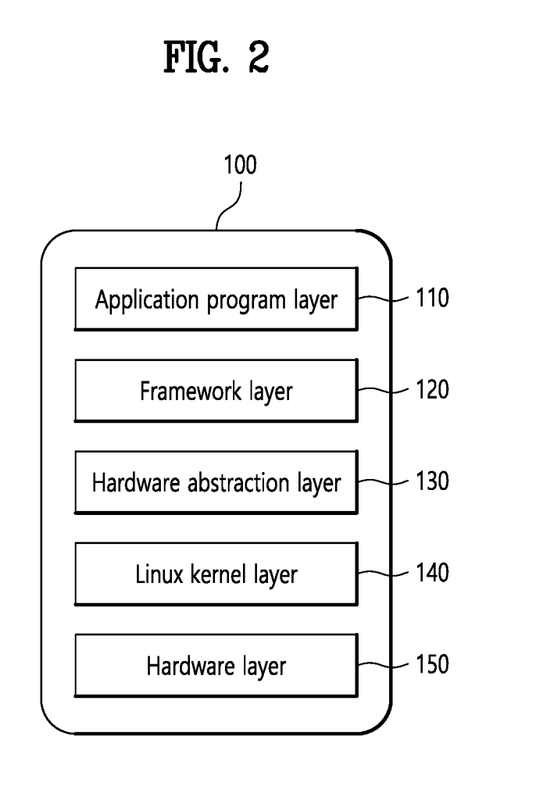
FIGS. 2 and 3 are control block diagrams of a device on which Android operating system is installed.
Figure 3:
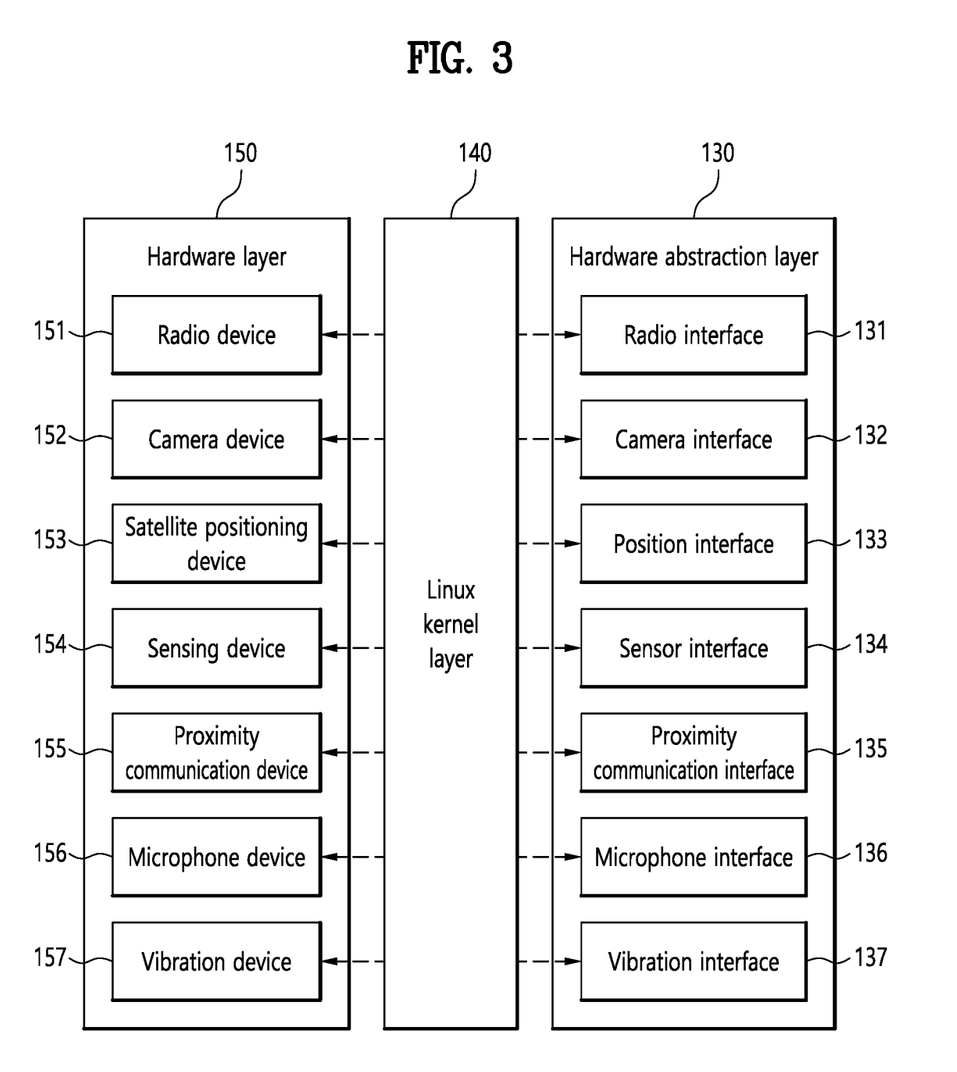

FIGS. 2 and 3 are control block diagrams of the device on which Android OS is installed.

The device 100 having Android OS may include the application program layer 110, the framework layer 120, the hardware abstraction layer 130, the Linux kernel layer 140 and the hardware layer 150.

In relation to this, the device 100 may be a device, on which the OS including the hardware abstraction layer is installed. In this instance, the OS including the hardware abstraction layer may refer to Android OS, and accordingly, the device 100 may include a smartphone and a tablet on which the Android OS is installed.

Meanwhile, the hardware layer 150 may refer to a device connected to the device 100, and accordingly, the device connected to the device 100 may be understood as a hardware.

In this instance, the hardware layer 150 may include the radio device 151, the camera device 152, the satellite positioning device 153, the sensing device 154, the proximity communication device 155, the microphone device 156 and the vibration device 157 connected to or embedded or mounted in the device 100.

The radio device 151 may be connected to or embedded or mounted in the device 100 to perform SMS or make calls with another device 100 by the control of the device 100.

Here, the radio device 151 may be configured to transmit or receive short messages to/from another device 100 using wireless communication, and additionally, the radio device 151 may be configured to make calls with another device 100 using wireless communication.

Additionally, the camera device 152 may be connected to or embedded or mounted in the device 100 to take pictures to generate image information by the control of the device 100, the satellite positioning device 153 may be connected to or embedded or mounted in the device 100 to measure positions to generate position information by the control of the device 100, and the sensing device 154 may be connected to or embedded or mounted in the device 100 to generate arbitrary measurement information by the control of the device 100.

In this instance, the sensing device 154 may include a gyro sensor and an acceleration sensor capable of measuring the rotational movement of the device 100 or acceleration in the movement. The sensing device 154 may include sensors capable of measuring the surrounding environmental conditions such as temperature, pressure, light intensity and humidity. The sensing device 154 may include a touch sensor capable of recognizing the user's touch.

Additionally, the proximity communication device 155 may refer to an NFC device connected to or embedded or mounted in the device 100 to carry out communication using the frequency of 13.56 MHz at the distance of 10 cm or less, the microphone device 156 may be connected to or embedded or mounted in the device 100 to detect sound waves transmitted from the outside to generate audio information by the control of the device 100, and the vibration device 157 may be connected to or embedded or mounted in the device 100 to generate vibration by the control of the device 100.

The Linux kernel layer 140 may contain hardware drivers that access and control each device of the hardware layer 150. Accordingly, the Linux kernel layer 140 may transmit information generated from each device connected to the device 100 to the Android OS, and the Linux kernel layer 140 may be responsible for process and memory management, security, network and power management.

The hardware abstraction layer 130 may be a layer for supporting the independence of the devices connected to the device 100, and the hardware abstraction layer 130 may provide an abstraction for the devices connected to the device 100, thereby making it possible to control each device without needing to directly access each device. To this end, when events are generated from the hardware drivers, the hardware abstraction layer 130 may request methods that match the corresponding events, and transmit the requested methods to the framework layer 120.

The framework layer 120 may include a class used to write an application program such as an application and software based on Android OS, and an abstract class for hardware interface, user interface and resource management. Accordingly, a developer of the application based on Android OS may write the application using API in the framework layer 120.

Meanwhile, referring to FIG. 3, it is possible to identify a relationship between the hardware drivers in the Linux kernel layer 140 and the hardware interfaces having the methods for each hardware driver.

As described above, when the events are generated from the hardware drivers in the Linux kernel layer 140, the hardware abstraction layer 130 may request the methods that match the corresponding events, and transmit the requested methods to the framework layer 120.

Figure 4:
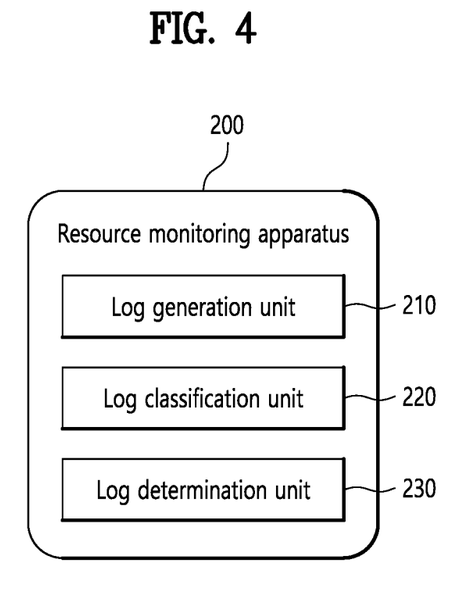
FIG. 4 is a control block diagram of a resource monitoring apparatus according to an embodiment of the present disclosure.

FIG. 4 is a control block diagram of the resource monitoring apparatus according to an embodiment of the present disclosure.

The resource monitoring apparatus 200 may include a log generation unit 210, a log classification unit 220 and a log determination unit 230.

The log generation unit 210 may extract methods requested from the hardware abstraction layer 130 of the OS installed on the device 100, and the log generation unit 210 may record the extracted methods to generate logs.

In relation to this, the radio interface 131 may be configured to perform the function of the radio interface layer connecting the radio device 151 configured to perform SMS and phone functions to the framework layer 120.

Accordingly, the log generation unit 210 may record the methods for SMS and phone calls requested from the radio interface 131 to generate the logs.

Meanwhile, the log generation unit 210 may extract the generated logs using logcat command that is used to record the methods requested from the hardware abstraction layer 130 of the Android OS.

The log classification unit 220 may classify the logs generated from the requested methods according to the type of hardware interface connected to the methods.

In this instance, the log classification unit 220 may classify the logs generated by the radio interface 131 into a plurality of preset methods based on the methods requested from the radio interface 131.

Additionally, the log classification unit 220 may classify the logs by generating separate methods to include an arbitrary method requested from the hardware abstraction layer 130 by the hardware interface for each device connected to the device 100.

Additionally, by the hardware interface for each device connected to the device 100, the log classification unit 220 may extract and classify the logs for at least one of the methods requested from the hardware abstraction layer 130.

For example, the log classification unit 220 may classify the logs generated when a request for sending a short message is made among the methods requested from the radio interface 131, and the log classification unit 220 may extract and classify the logs generated when a request for calling history is made among the methods requested from the radio interface 131.

Additionally, the log classification unit 220 may extract and classify the logs generated when the camera device 152 operates and the logs generated when the camera device 152 stops operating among the methods requested from the camera interface 132.

Additionally, the log classification unit 220 may extract and classify the logs generated when a request for position information is made among the methods requested from the position interface 133.

Additionally, the log classification unit 220 may extract and classify the logs generated when a request for arbitrary measurement information is made among the methods requested from the sensor interface 134, and the log classification unit 220 may extract and classify the logs generated when a request to carry out proximity communication is made among the methods requested from the proximity communication interface 135.

Additionally, the log classification unit 220 may extract and classify the logs generated when the microphone device 156 operates and the logs generated when the microphone device 156 stops operating among the methods requested from the microphone interface 136.

Additionally, the log classification unit 220 may extract and classify the logs generated when the vibration device 157 operates and the logs generated when the vibration device 157 stops operating among the methods requested from the vibration interface 137.

The log determination unit 230 may determine the malicious activity from the classified logs based on the pattern information of the logs set differently depending on the type of hardware interface.

For example, when the generated log is determined as the method requesting for sending a short message among the methods requested from the radio interface 131, and the number of times the method requesting for sending a short message repeatedly occurs within the preset first time interval exceeds the preset number of times, the log determination unit 230 may determine that the malicious activity occurred in the radio interface 131.

Additionally, among the methods requested from the radio interface 131, when the number of times the method requesting calling history associated with the generated log occurs exceeds the preset number of times within the preset second time interval, the log determination unit 230 may determine that the malicious activity occurred in the radio interface 131.

Additionally, from the logs classified according to the camera interface 132, the log determination unit 230 may calculate the time interval from the start time of the camera device 152 to the stop time of the camera device 152, and accordingly, when the calculated time interval exceeds the preset third time interval, the log determination unit 230 may determine that the malicious activity occurred in the camera interface 132.

Additionally, from the logs classified according to the position interface 133, when the number of times the method requesting position information is generated and accumulated for an arbitrary period of time exceeds the preset number of times within the preset second time interval, the log determination unit 230 may determine that the malicious activity occurred in the position interface 133.

Additionally, from the logs classified according to the sensor interface 134, when the number of times the method requesting arbitrary measurement information occurs exceeds the preset number of times within the preset second time interval, the log determine unit 230 may determine that the malicious activity occurred in the sensor interface 134.

Additionally, from the logs classified according to the proximity communication interface 135, when the number of times the method requesting to carry out proximity communication repeatedly occurs within the preset first time interval exceeds the preset number of times, the log determination unit 230 may determine that the malicious activity occurred in the proximity communication interface 135.

Additionally, from the logs classified according to the microphone interface 136, the log determination unit 230 may calculate the time interval from the start time of the microphone device 156 to the stop time of the microphone device 156, and when the calculated time interval exceeds the preset third time interval, the log determination unit 230 may determine that the malicious activity occurred in the microphone interface 136.

Additionally, from the logs classified according to the vibration interface 137, the log determination unit 230 may calculate the time interval from the start time of the vibration device to the stop time of the vibration device, and when the calculated time interval exceeds the preset third time interval, the log determination unit 230 may determine that the malicious activity occurred in the vibration interface 137.

Additionally, from the logs classified according to the vibration interface 137, when the number of times the method requesting to perform the operation of the vibration device and the method requesting to stop the operation of the vibration device repeatedly occur within the preset first time interval exceeds the preset number of times, the log determination unit 230 may determine that the malicious activity occurred in the vibration interface 137.

Figure 5:
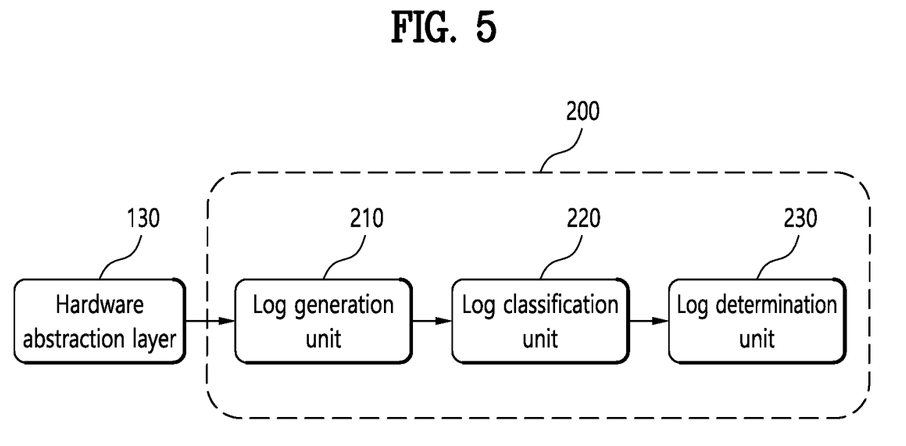
FIG. 5 is a block diagram showing a process of determining malicious activity by a log determination unit.

FIG. 5 is a block diagram showing the process of determining the malicious activity by the log determination unit.

Referring to FIG. 5, the log generation unit 210 may extract methods requested from the hardware abstraction layer 130 of the OS installed on the device 100, and record the extracted methods to generate logs.

In this instance, the log generation unit 210 may extract the generated logs using logcat command that is used to record the methods requested from the hardware abstraction layer 130 of the Android OS.

Accordingly, the log classification unit 220 may classify the logs generated from the requested methods according to the type of hardware interface connected to the methods.

In this instance, the log classification unit 220 may classify the logs generated by the radio interface 131 into a plurality of preset methods based on the methods requested from the radio interface 131.

Additionally, the log classification unit 220 may classify the logs by generating separate methods to include an arbitrary method requested from the hardware abstraction layer 130 by the hardware interface for each device connected to the device 100.

Additionally, by the hardware interface for each device connected to the device 100, the log classification unit 220 may extract and classify the logs for at least one of the methods requested from the hardware abstraction layer 130.

Accordingly, the log determination unit 230 may determine the malicious activity from the classified logs based on the pattern information of the logs set differently depending on the type of hardware interface.

For example, when the generated log is determined as the method requesting for sending a message among the methods requested from the radio interface 131, and the number of times the method requesting for sending a short message repeatedly occurs within the preset first time interval exceeds the preset number of times, the log determination unit 230 may determine that the malicious activity occurred in the radio interface 131.

Additionally, among the methods requested from the radio interface 131, when the number of times the method requesting calling history associated with the generated log occurs exceeds the preset number of times within the preset second time interval, the log determination unit 230 may determine that the malicious activity occurred in the radio interface 131.

Additionally, from the logs classified according to the camera interface 132, the log determination unit 230 may calculate the time interval from the start time of the camera device 152 to the stop time of the camera device 152, and accordingly, when the calculated time interval exceeds the preset third time interval, the log determination unit 230 may determine that the malicious activity occurred in the camera interface 132.

Additionally, from the logs classified according to the position interface 133, when the number of times the method requesting position information is generated and accumulated for an arbitrary period of time exceeds the preset number of times within the preset second time interval, the log determination unit 230 may determine that the malicious activity occurred in the position interface 133.

Additionally, from the logs classified according to the sensor interface 134, when the number of times the method requesting arbitrary measurement information occurs exceeds the preset number of times within the preset second time interval, the log determination unit 230 may determine that the malicious activity occurred in the sensor interface 134.

Additionally, from the logs classified according to the proximity communication interface 135, when the number of times the method requesting to carry out proximity communication repeatedly occurs within the preset first time interval exceeds the preset number of times, the log determination unit 230 may determine that the malicious activity occurred in the proximity communication interface 135.

Additionally, from the logs classified according to the microphone interface 136, the log determination unit 230 may calculate the time interval from the start time of the microphone device 156 to the stop time of the microphone device 156, and when the calculated time interval exceeds the preset third time interval, the log determination unit 230 may determine that the malicious activity occurred in the microphone interface 136.

Additionally, from the logs classified according to the vibration interface 137, the log determination unit 230 may calculate the time interval from the start time of the vibration device to the stop time of the vibration device, and when the calculated time interval exceeds the preset third time interval, the log determination unit 230 may determine that the malicious activity occurred in the vibrator interface 137.

Additionally, from the logs classified according to the vibration interface 137, when the number of times the method requesting to perform the operation of the vibration device and the method requesting to stop the operation of the vibration device repeatedly occur within the preset first time interval exceeds the preset number of times, the log determination unit 230 may determine that the malicious activity occurred in the vibration interface 137.

Figure 6:
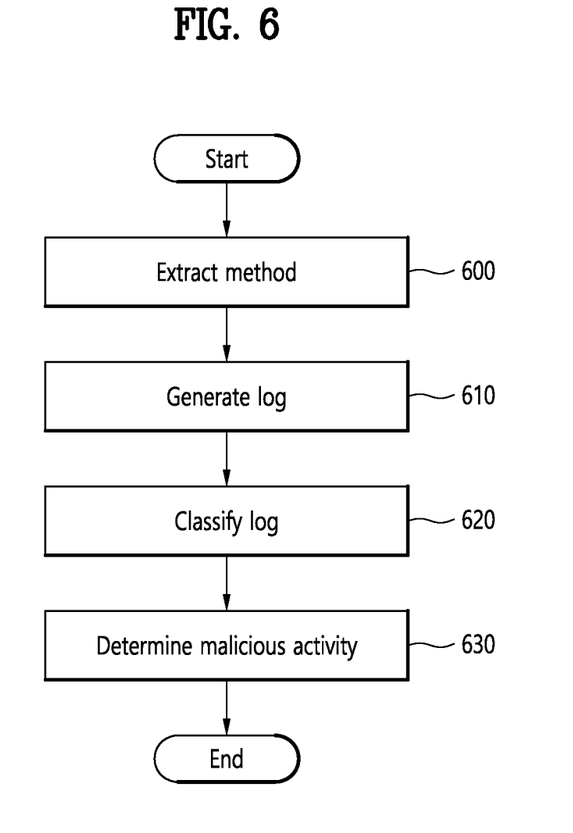
FIG. 6 is a flowchart of a resource monitoring method according to an embodiment of the present disclosure.

FIG. 6 is a flowchart of a resource monitoring method according to an embodiment of the present disclosure.

The resource monitoring method according to an embodiment of the present disclosure is performed on substantially the same configuration as the resource monitoring apparatus 200 shown in FIG. 1, and thus the same reference numeral is given to the same element as the resource monitoring apparatus 200 of FIG. 1, and the repeated description is omitted.

The resource monitoring method may include the step of extracting methods 600, the step of generating logs 610, the step of classifying the logs 620, and the step of determining malicious activity 630.

The step of extracting methods 600 may include extracting, by the log generation unit 210, methods requested from the hardware abstraction layer 130 of the OS installed on the device 100.

The step of generating logs 610 may include recording, by the log generation unit 210, the methods extracted from the hardware abstraction layer 130 of the OS installed on the device 100 to generate the logs.

In this instance, the step of generating logs 610 may include extracting the generated logs using logcat command that is used to record the methods requested from the hardware abstraction layer 130 of the Android OS.

The step of classifying the logs 620 may include classifying, by the log classification unit 220, the logs generated from the requested methods according to the type of hardware interface connected to the methods.

In this instance, the step of classifying the logs 620 may include classifying the logs generated by the radio interface 131 into a plurality of preset methods based on the methods requested from the radio interface 131.

Additionally, the step of classifying the logs 620 may include classifying the logs by generating separate methods to include an arbitrary method requested from the hardware abstraction layer 130 by the hardware interface for each device connected to the device 100.

Additionally, the step of classifying the logs 620 may include extracting and classifying the logs for at least one of the methods requested from the hardware abstraction layer 130 by the hardware interface for each device connected to the device 100.

The step of determining malicious activity 630 may include determining, by the log determination unit 230, malicious activity from the classified logs based on the pattern information of the logs set differently depending on the type of hardware interface.

For example, the step of determining malicious activity 630 may include determining that the malicious activity occurs in the radio interface 131 when the generated log is determined as the method requesting for sending a short message among the methods requested from the radio interface 131 and the number of times the method requesting for sending a short message repeatedly occurs within the preset first time interval exceeds the preset number of times.

Additionally, the step of determining malicious activity 630 may include determining that the malicious activity occurs in the radio interface 131 when the number of times the method requesting calling history associated with the generated log among the methods requested from the radio interface 131 occurs exceeds the preset number of times within the preset second time interval.

Additionally, the step of determining malicious activity 630 may include, from the logs classified according to the camera interface 132, calculating the time interval from the start time of the camera device 152 to the stop time of the camera device 152, and accordingly, may include, by the log determination unit 230, determining that the malicious activity occurs in the camera interface 132 when the calculated time interval exceeds the preset third time interval.

Additionally, the step of determining malicious activity 630 may include, from the logs classified according to the position interface 133, determining that the malicious activity occurs in the position interface 133 when the number of times the method requesting position information is generated and accumulated for an arbitrary period of time exceeds the preset number of times within the preset second time interval.

Additionally, the step of determining malicious activity 630 may include, from the logs classified according to the sensor interface 134, determining that the malicious activity occurs in the sensor interface 134 when the number of times the method requesting arbitrary measurement information occurs exceeds the preset number of times within the preset second time interval.

Additionally, the step of determining malicious activity 630 may include, from the logs classified according to the proximity communication interface 135, determining that the malicious activity occurs in the proximity communication interface 135 when the number of times the method requesting to carry out proximity communication repeatedly occurs within the preset first time interval exceeds the preset number of times.

Additionally, the step of determining malicious activity 630 may include, from the logs classified according to the microphone interface 136, calculating the time interval from the start time of the microphone device 156 to the stop time of the microphone device 156, and determining that the malicious activity occurs in the microphone interface 136 when the calculated time interval exceeds the preset third time interval.

Additionally, the step of determining malicious activity 630 may include, from the logs classified according to the vibration interface 137, calculating the time interval from the start time of the vibration device to the stop time of the vibration device, and determining that the malicious activity occurs in the vibration interface 137 when the calculated time interval exceeds the preset third time interval.

Additionally, the step of determining malicious activity 630 may include, from the logs classified according to the vibration interface 137, determining that the malicious activity occurs in the vibration interface 137 when the number of times the method requesting to perform the operation of the vibration device and the method requesting to stop the operation of the vibration device repeatedly occur within the preset first time interval exceeds the preset number of times.

While the present disclosure has been hereinabove described with reference to the embodiments, those skilled in the art will understand that various modifications and change may be made thereto without departing from the spirit and scope of the present disclosure defined in the appended claims.

REFERENCE NUMERAL

1: Resource monitoring system
100: Device
200: Resource monitoring apparatus

The invention claimed is:

1. A resource monitoring apparatus comprising:
at least one hardware processor;
a not-transitory computer-readable storage medium storing instructions which, when executed by the at least one hardware processor, are configured to perform operations comprising,
extracting a method requested from a hardware abstraction layer of an operating system installed on a device and recording the extracted method to generate a log;
classifying the generated log according to a type of an interface connected to the method; and
determining a malicious activity from the classified log based on pattern information of the log set differently depending on the type of the interface.

2. The resource monitoring apparatus according to claim 1, wherein generating the log comprises recording a method for a short message service and a phone call requested from a radio interface to generate a log.

3. The resource monitoring apparatus according to claim 2, wherein classifying the log comprises classifying the log generated by the radio interface into a plurality of preset methods based on a method requested from the radio interface.

4. The resource monitoring apparatus according to claim 3, wherein determining the malicious activity comprises determining that a malicious activity occurs in the radio interface in response to the generated log being determined as a method requesting for sending a short message among a method requested from the radio interface, and a number of times the method requesting for sending a short message repeatedly occurs within a preset first time interval exceeding a preset number of times.

5. The resource monitoring apparatus according to claim 1, wherein the interface includes,
a camera interface having a method for a camera device connected to the device; and
a position interface having a method for a satellite positioning device connected to the device.

6. The resource monitoring apparatus according to claim 5, wherein the interface further includes a sensor interface, a proximity communication interface, a microphone interface and a vibration interface.

7. The resource monitoring apparatus according to claim 5, wherein determining the malicious activity comprises calculating, from a log classified according to the camera interface, a time interval from a start time of a camera device to a stop time of the camera device, and determining that a malicious activity occurs in the camera interface in response to the time interval exceeding a preset third time interval.

8. The resource monitoring apparatus according to claim 5, wherein determining the malicious activity comprises, from a log classified according to the position interface, determining that a malicious activity occurs in the position interface in response to a number of times a method requesting position information is generated and accumulated for a predetermined period of time exceeding a preset number of times within a preset second time interval.

9. A resource monitoring method of a resource monitoring apparatus using a hardware abstraction layer comprising:
extracting a method requested from a hardware abstraction layer of an operating system installed on a device;
recording the extracted method to generate a log;
classifying the generated log according to a type of an interface connected to the method; and
determining a malicious activity from the classified log based on pattern information of the log set differently depending on the type of the interface.

10. The resource monitoring method according to claim 9, wherein generating the log comprises recording a method for a short message service and a phone call requested from a radio interface to generate a log.

11. The resource monitoring method according to claim 10, wherein classifying the log comprises classifying the log generated by the radio interface into a plurality of preset methods based on a method requested from the radio interface.

12. The resource monitoring method according to claim 11, wherein determining the malicious activity comprises determining that a malicious activity occurs in the radio interface in response to the generated log being determined as a method requesting for sending a short message among a method requested from the radio interface, and a number of times the method requesting for sending a short message repeatedly occurs within a preset first time interval exceeding a preset number of times.

13. The resource monitoring method according to claim 9, wherein the interface includes,
   a camera interface having a methods for a camera device connected to the device; and
   a position interface having a method for a satellite positioning device connected to the device.

14. The resource monitoring method according to claim 13, wherein the interface further includes a sensor interface, a proximity communication interface, a microphone interface and a vibration interface.

15. The resource monitoring method according to claim 13, wherein determining the malicious activity comprises calculating, from a log classified according to the camera interface, a time interval from a start time of a camera device to a stop time of the camera device, and determining that a malicious activity occurs in the camera interface in response to the time interval exceeding a preset third time interval.

16. The resource monitoring method according to claim 13, wherein determining the malicious activity comprises, from a log classified according to the position interface, determining that a malicious activity occurs in the position interface in response to a number of times a method requesting position information is generated and accumulated for a predetermined period of time exceeding a preset number of times within a preset second time interval.

* * * * *